United States Patent [19]

Morse

[11] Patent Number: 4,557,402

[45] Date of Patent: Dec. 10, 1985

[54] HOPPER FEED MECHANISM

[75] Inventor: Albert I. Morse, Beverly, Mass.

[73] Assignee: USM Corporation, Farmington, Conn.

[21] Appl. No.: 561,835

[22] Filed: Dec. 15, 1983

[51] Int. Cl.[4] ............................................. B65D 88/66
[52] U.S. Cl. .................................... 222/230; 366/184; 366/241
[58] Field of Search ............... 222/230, 227, 226, 228, 222/245, 74, 527, 526, 528, 529; 239/689; 366/184, 241; 141/382, 379, 388

[56] References Cited

U.S. PATENT DOCUMENTS

| | | | |
|---|---|---|---|
| 2,322,171 | 6/1943 | Spatz | 222/230 X |
| 3,093,165 | 6/1963 | Risser | 141/279 X |

Primary Examiner—Stanley H. Tollberg
Attorney, Agent, or Firm—Aubrey C. Brine

[57] ABSTRACT

A hopper feed apparatus for the powder hopper of a powder reinforcing machine, to keep the hopper and its supply conduit free of clogged powder, the apparatus comprising of an arrangement of springs attached to the top of the hopper on the inside thereof, which springs extend downwardly to a common point near the discharge orifice, to where they are attached to a line which extends through the conduit. The lower end of the conduit is secured to a movable dispensing apparatus, which when it moves, pulls on the line and biases the springs, all of which agitate any powder within the hopper and the conduit, preventing it from caking and otherwise clogging the system.

4 Claims, 1 Drawing Figure

U.S. Patent　　　Dec. 10, 1985　　　4,557,402
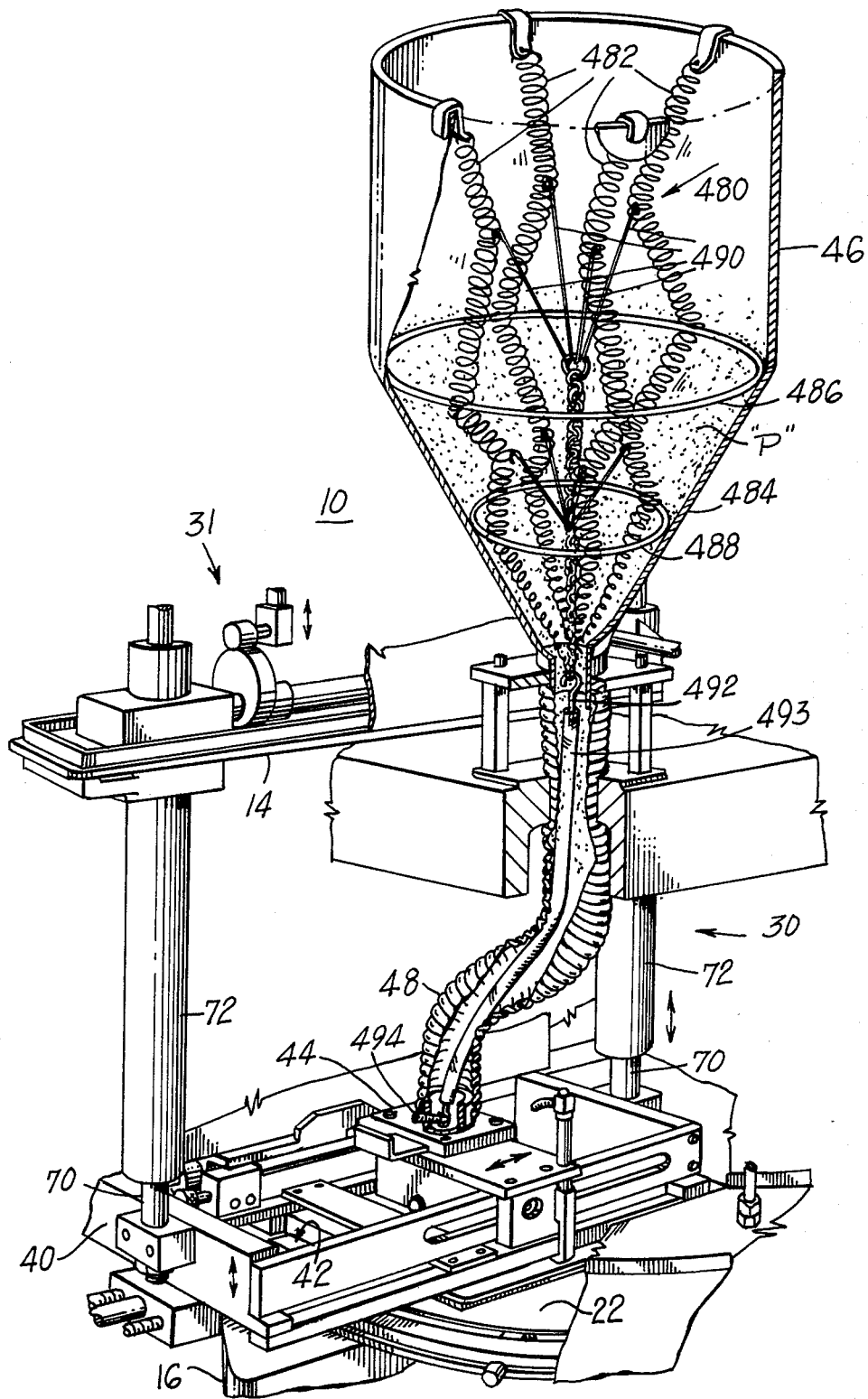

HOPPER FEED MECHANISM

BACKGROUND OF THE INVENTION (1) Field of the Invention

This invention relates to powder deposition machinery, and more particularly to a machine utilizable for applying a coating of plastic material originally in powdered form in a hopper, through a deposition apparatus and onto a shoe upper.

(2) Summary of the Prior Art

The shoe and apparel industry have for many years been applying stiffening and reinforcing means to their shoe uppers, blue jeans, pajamas, sports clothing, visors of caps and the like, and manufacturers have stitched, glued or otherwise applied layers of reinforcing material to their products for a variety of reasons. It has been standard for the shoe industry to apply the reinforcement/stiffening or decorative means as a layer of molten thermoplastic material adhereable to a shoe upper. Early attempts at reinforcing or stiffening a shoe upper have included providing preformed stiffener elements or counters, which are inserted into a shoe upper, prior to lasting. Separate moldable sheet materials softenable by heating or by solvent have been inserted into the shoe uppers prior to lasting and are shaped in the course of lasting to a desired configuration which configuration they retain by being allowed to harden before removal of the shoe upper from the last. Shoe uppers have been stiffened by impregnating a shoe component with a solution or dispersion in a volatile liquid vehicle of hardenable stiffener materials prior to lasting of the shoe upper, the shoe upper being stiffened by hardening of the impregnated material after the shoe is lasted.

A more recent arrangement for stiffening and or reinforcing shoe components or the like is shown in U.S. patent application Ser. No. 451,919, wherein a rotary deposition machine receives a powdered fusible material from a hopper and drops it through a conduit into a stencil apparatus. The powder is then drawn through the stencil and onto a rotatable receiving belt which carries the configuration of powder through an arcuate array of heating elements, finally into a join and cool station where a substrate such as a shoe upper or the like is pressed thereagainst, to withdraw the then fused configuration of powder from the rotatable belt. Sometimes, the powder in the hopper and/or the stencil will cake and not fall properly. A pneumatic "thumper" mechanism has been arranged on the stencil apparatus to free any caked powder therefrom.

The tubular conduit which leads to the stencil, from the hopper may accumulate the powder therein and prevent a proper discharge of the powder into the stencil apparatus.

It is an object of the present invention to provide an arrangement for keeping the conduit free of accumulated powder.

It is a further object of the present invention to keep the powder in the hopper in a proper state and enable the hopper to discharge its powder into the conduit in a desired granular state.

BRIEF SUMMARY OF THE INVENTION

The present invention comprises a mechanism to help the flow of powder in an apparatus for reinforcing/stiffening and/or decorating substrates such as shoe uppers, sports equipment, clothing or the like by the application of a fusible powder material thereon. The apparatus comprises a generally cylindrically shaped frame having a circular receiving surface rotatable about a plurality of arcuately spaced work stations arranged about the frame. The first station comprises a deposition station. The second station comprises an arcuate array of heating elements arranged above and beneath the receiving surface, and the third station comprises a join and cool and/or press station. The deposition station is synchronously arranged for slight up and down movement over the horizontally rotatable receiving surface, in timed relation to a support plate arranged for slight up and down movement beneath the receiving surface. The deposition station includes a stencil means which receives a supply of powder through a flexible conduit attached to a supply hopper disposed above the frame over the stencil means. The stencil means comprises a reciprocably movable dispenser-carriage arranged in a housing structure, the bottom surface of which comprises a stencil assembly. The stencil is the replaceable lower surface of the housing, having a smooth impermeable upper surface, a foil-like lower surface and a screen "sandwiched" therebetween, a cut-out being arranged in between the upper and lower surfaces. The dispenser-carriage may be moved across the stencil assembly by a funicular means.

The flexible conduit is attached to the dispenser-carriage, the upper end of the conduit being connected to the lowermost discharge orifice of the hopper. A powder displacement means is arranged within the hopper and extends downwardly through the discharge orifice, into the flexible conduit, attached at its lowermost end thereof to a location on the edge of conduit. The displacement means comprises a plurality of springs attached to the upper peripheral portion of the hopper. The springs may be attached at a middle location within the hopper to a ring or to hooks therein, and extend to a confluence at the discharge orifice of the hopper, wherefrom their common point, a flexible chain or line is arranged, through the flexible conduit, and attached to the location at the bottom thereof.

The reciprocably movable dispenser-carriage to which the lower end of the flexible conduit is secured, effectuates motion of the line within the conduit, and also effectuates movement of the springs arranged within the hopper. This constant agitation is sufficient to chafe the powder within the hopper and the conduit to keep it flowing freely therewithin, thus preventing the powder from caking or clogging up the feed system of the machine. Additionally, the housing in which the carriage-dispenser reciprocates is moved upwardly and downwardly onto the receiving belt. This vertical motion pulls on the line in the conduit, which pulls on and stretches the springs within the hopper in a generally up and down direction to further prevent the powder from caking therewithin.

BRIEF DESCRIPTION OF THE DRAWING

The objects and advantages of the present invention will become more apparent, when viewed in conjunction with the following drawing, in which:

The FIGURE is a perspective view of a powder reinforcing machine having a hopper feed mechanism therewith, portions being cut away for clarity.

DESCRIPTION OF THE PREFERRED EMBODIMENT

Referring to the drawing in detail, there is partially shown a powder reinforcing machine 10, as was fully described in U.S. Pat. application Ser. No. 451,919 filed Dec. 27, 1982 assigned to the assignee of the present invention and incorporated herein by reference which machine 10 comprises a generally cylindrically arranged frame comprising a horizontally disposed upper frame portion 14, and a horizontally disposed middle frame portion 16 supported on a base.

An annular receiving belt 22 is horizontally rotatable about a hub not shown, the receiving belt 22 being arcuately advanceable in a stepwise counterclockwise direction, through a plurality of circumferentially spaced work stations, arranged on the middle and upper frame portions 16 and 14 of the machine 10.

The first work station comprises a powder deposition station 30.

The deposition station 30 is supported by a reciprocating means 31 secured to the upper frame portion 14 more fully described and shown in the aforementioned application. The deposition station 30 comprises a rectangular frame 40 arranged at least partially over and parallel to the horizontal receiving belt 22. The bottom of the deposition station 30 comprises a stencil assembly, including a replaceable template or stencil 42. The stencil comprises a lower wire mesh screen supported on a frame. The wire mesh screen, not shown, has a smooth impervious surface adhered thereto, and a lowermost foil-like surface adhered thereunder, each surface having a cut-out arranged thereacross and aligned with one another. The cut-out is formed into the desired shape of the powder to be deposited onto the receiving belt 22. A dispenser-carriage 44 is slidingly arranged in the frame 40 of the deposition station 30.

A holding tank or hopper 46 is supported on the top side of the upper frame portion 14 to hold a fusible powder "P" such as a 35–50 mesh ionomer powder of the sodium cation type, with possible additives such as coloring or anti-static agents. A flexible conduit 48 has an upper end secured to the bottom of the hopper 46, as shown in the figure. The lower end of the conduit 48 is attached to the dispenser-carriage 44 for distribution of powder therethrough during operation of the deposition station 30. A pressurizable cable cylinder, shown in the aforementioned application, is arranged along one side of the rectangular frame 40 articulated with the dispenser-carriage 44 to provide the motivation for dispenser-carriage 44 to sweep back and forth across the stencil means. A support rod 70 is attached at its lower end, to each end of the rectangular frame 40 of the deposition station 30. Each support rod 70 extends through a tubular bearing 72 to the reciprocation means 31, arranged to lower and raise the rectangular frame 40 and the stencil assembly onto and up from the receiving belt 22 as part of the deposition process, the dispenser carriage 44 sweeping across the stencil means while the latter is disposed on the receiving belt 22.

A powder displacement means 480, shown in the figure, is arranged within the hopper 46 and extends downwardly through the flexible conduit 48 to ensure that the powder that is conducted therethrough does not cake up or accumulate so as to clog the supply system. The powder displacement means 480 comprises a plurality of springs 482, attached at one end thereof to the upper periphery of the hopper 46. Each spring 482 has a lower end which is attached to the other springs 482 at a confluence in the discharge orifice of the hopper 46. The coils of the springs 482 may be of larger coil diameter at their upper end and be of smaller coil diameter at their lowest end so as to agitate more proportionately its adjacent powder. The hopper 46 separates into a cone-shaped portion 484 near its mid-point, as shown in the figure. A first ring 486 may be disposed within the hopper 46, at the uppermost location of the cone-shaped portion 484, the first ring 486 being of a smaller diameter than the largest inside diameter of the hopper 46 or hooks attached therewithin to be used to hold the springs near the walls of the hopper 46. The first ring 486 serves to hold the springs 482 outwardly towards the inner surface of the hopper 46, and helps keep the springs 482 circumferentially spaced from one another. A second ring 488 may be disposed within the cone-shaped portion 484 of the hopper 46 to keep the springs 482 in close contact with the walls of the hopper 46 just above its discharge orifice and their common juncture. A set of links 490 are connected to one other at a mid-point of the hopper 46, and extend to each spring 482 at a point about halfway between the first ring 486 and the upper periphery of the hopper 46. The links 490 serve to pull the springs 482 radially inwardly from the walls of the hopper 46.

A flexible line 492 or chain, encased in a flexible sheath 493, is attached at the common juncture of the springs 482, and extends downwardly through the flexible conduit 48, and is attached at the bottom thereof by a securement means 494, such as a bolt or the like.

When the dispenser-carriage 44 is driven across the rectangular frame 40, it pulls the flexible line 492 to one direction, thus causing the springs 482 and their associated links 490 to move responsively within the hopper 46. When the rectangular frame 40 is lowered onto and lifted from the receiving belt 22 by the reciprocation means 31, as described in the aforementioned application, the line 492 is pulled in response downwardly, which pulls on the springs 482 within the hopper. All this biasing on the line 492 causes its movement within the flexible conduit 48 and also causes the agitation of the powder within the hopper 46 by the motions of the springs 482 therein. This agitation keeps the powder flowing downwardly as required, preventing the deposition station 38 from being clogged up by powder therein, particularly at the bottom of the hopper 46.

Thus there has been shown a unique mechanism for eliminating the clogging-up of a supply hopper for a powder deposition machine, by taking advantage of the motion within one portion of the mechanism, to agitate the powder in other portions of the mechanism, permitting a free flowing powder within the machine.

It is intended that the appended claims be interpreted as exemplary only and not in a limiting sense.

We claim:

1. A hopper feed apparatus for the supply system of a powder reinforcing machine, comprising:
   a hopper supply arranged on a frame portion of the machine;
   a flexible conduit disposed between said hopper and a movable dispersal carriage of said machine, and
   a powder displacement means arranged within said hopper and said flexible conduit, which means responds to normal movement of said dispersal carriage to maintain the powder in said hopper and conduit in a free flowing condition;

said powder displacement means comprising an arrangement of springs attached to said hopper, which are biasable for biasing means within said conduit, comprising a line to said springs, said line being attached at its upper end to a common juncture of the lower ends of said springs in said hopper.

2. A hopper feed apparatus for the supply system of a powder reinforcing machine as recited in claim 1, wherein means are arranged within said hopper to hold and space said springs at a certain location therewithin.

3. A hopper feed apparatus for the supply system of a powder reinforcing machine, as recited in claim 2 wherein an arrangement of links interconnect said springs and one another to pull a portion of said springs from the walls of said hopper.

4. A hopper feed apparatus for the supply system of a powder reinforcing machine, as recited in claim 2, wherein said spring spacing means comprises a ring adapted to secure said springs within said hopper.

* * * * *